United States Patent Office 3,485,732

Patented Dec. 23, 1969

1

3,485,732

HIGHLY RADIATION-SENSITIVE TELOMERIZED POLYESTERS

Gaetano F. D'Alelio, South Bend, Ind., assignor, by mesne assignments, to PPG Industries, Inc., Pittsburgh, Pa., a corporation of Pennsylvania No Drawing. Filed Mar. 2, 1966, Ser. No. 531,056
Int. Cl. B01j *1/10;* C08d *1/00;* C08f *1/16*
U.S. Cl. 204—159.15 20 Claims

ABSTRACT OF THE DISCLOSURE

Telomerized diacrylyl polyesters are obtained from the condensation of a glycidyl ester with a saturated aliphatic polycarboxylic acid or a linear polyester of such an acid. These polyesters have the formula:

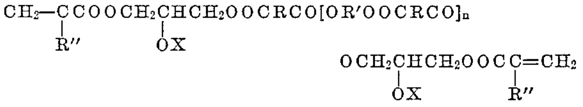

where *n* is 0 to 14, R is a single valence bond or a divalent saturated aliphatic hydrocarbon radical; R′ is a divalent saturated aliphatic hydrocarbon radical. R″ is hydrogen or methyl, R″″ is hydrogen or an aliphatic hydrocarbon radical, and *x* is hydrogen or an acyl radical of the formula R″″CO. These polyesters cure when subjected to relatively low doses of ionizing radiation.

This invention in general deals with radiation-sensitive polymers. Particularly it concerns viscous, soluble, flowable, relatively low molecular weight polymers, known as oligomers, which, when subjected to ionizing radiation become insoluble and infusible. More specifically, it deals with telomerized polyesters which, on irradiation, convert to three-dimensional crosslinked, insoluble, infusible polymers at relatively low doses of ionizing radiation.

The telomerized polyesters used in the practice of this invention are linear polyesters which are derived from the condensation of a glycidyl acrylate with a saturated aliphatic, including cycloaliphatic, polycarboxylic acid or with a linear condensation polymer of such polycarboxylic acids and saturated aliphatic, including cycloaliphatic polyhydric alcohols. These telomerized polyesters have as end groups the highly radiation-sensitive group.

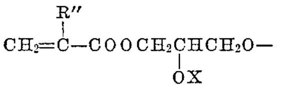

These telomerized polyesters can be represented by the general formula

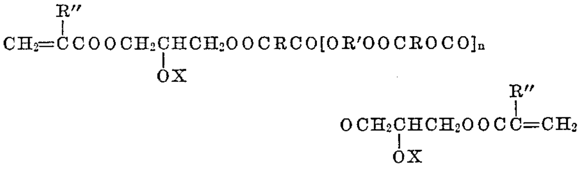

wherein *n* has a value of 0 to 14; R represents a connecting linkage between two adjacent carboxyl radicals selected from the class consisting of a single valence bond and a divalent saturated aliphatic hydrocarbon radical having 1–10 carbon atoms; R′ represents a divalent saturated aliphatic hydrocarbon radical (including cycloaliphatic) having 1–10 carbon atoms; R″ represents hydrogen or $CH_3$; R″″ represents hydrogen or an aliphatic hydrocarbon radical (saturated or unsaturated) having 1–18 carbon atoms; and X represents hydrogen or an acyl group having the formula R″″CO. The radical—OOCRCOO—can be defined as the dicarboxylic

2 radical derived from a saturated aliphatic dicarboxylic acid such as oxalic, malonic, succinic, glutaric, adipic acids, etc.

These highly radiation-sensitive telomerized polyesters are prepared from appropriate acrylyl derivatives such as the glycidyl esters,

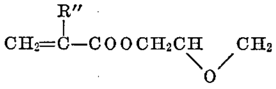

by reaction with carboxylic acids or carboxyl terminated saturated aliphatic polyesters. In these bases, the glycidyl acrylate which is a derivative of the trihydric glycerine yields linear esters containing one free unreacted hydroxyl group. Thus, the reaction of one mole of a dicarboxylic acid with two moles of a glycidyl acrylate corresponds to the reaction of one mole of a dicarboxylic acid, two moles of an acrylic acid, and two moles of glycerine which functions as a dihydric alcohol to give a radiation-sensitive polyester terminated with a hydroxy substituted acrylic ester, thus

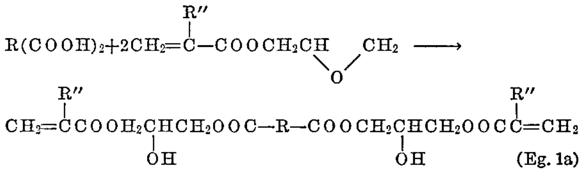

(Eg. 1a)

Similarly a dicarboxyl terminated aliphatic polyester can be reacted with glycidyl acrylate to produce linear hydroxyl substituted radiation-sensitive polyesters, thus $$(n+1)R(COOH)_2 + nR'(OH)_2 \longrightarrow HOOCRCO[OR'OOCR'CO]_nOH$$

then

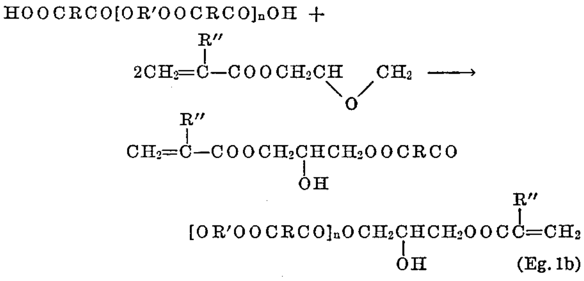

(Eg. 1b)

This second class of oligomers can be represented by the formula of equation 1*b* which includes that of Equation 1*a* when $n=0$, and of the higher molecular weight oligomers when *n* equals 1–14.

The hydroxy substituted oligomeric acrylyl terminated polymer esters as represented broadly by equations 1*a* and 1*b* have specific and improved utility especially when polymerized in the presence of cellulose such as wood, paper, fibers, fiber board, etc., in the form of a coating, impregnant or bonding agent. The presence of the alcoholic hydroxyl causes improved wetting of cellulose and because of hydrogen bonding of the hydroxyl group with the cellulose, yields improved adhesion compared to the unsubstituted oligomeric polyesters of Equation 1*a* to 1*g*.

In those cases where the presence of these hydroxyl groups is not desired or is detrimental to such properties as dielectric constant or power factor, the hydroxyl groups can be converted to ester groups by acylation with aliphatic acids, R″″COOH wherein R″″ is H or an aliphatic saturated or unsaturated hydrocarbon group containing 1 to 18 carbon atoms, such as formic, acetic, propionic, butyric, acrylic, methacrylic, oleic, stearic acid, etc., or their anhydrides forming a class of oligomeric polyesters suitable in the practice of this invention, thus:

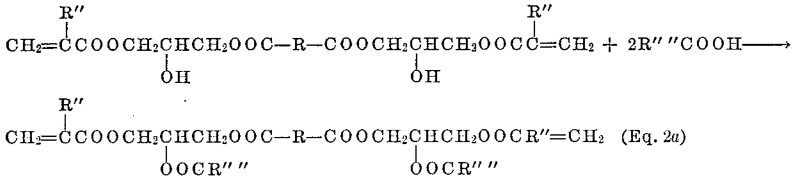

(Eq. 2a)

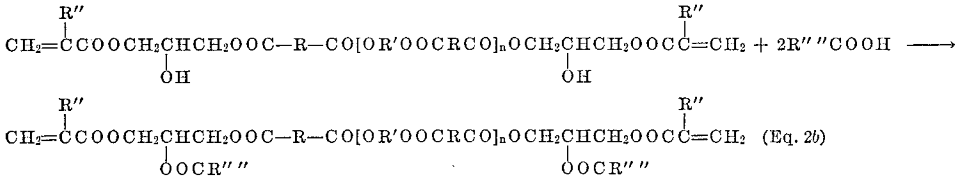

(Eq. 2b)

The radiation-sensitive oligomeric polymers of Equations 2*a* and 2*b* are particularly useful especially when admixed with other unsaturated polymeric alkyd esters such as polyethylene maleate, polyethylene fumarate, etc. The formula of Equation 2*b* represents the third class of radiation-sensitive telomerized polyesters wherein *n* has a value of 0 to 14.

Acrylation of the hydroxy substituted telomerized polyesters of Equation 1*b* by means of an acrylic acid, or its acrylyl anhydride or chloride produces a class of telomerized radiation-sensitive polymers which, because of the increased number of acrylyl groups, shows an even more improved response to ionizing radiation, thus

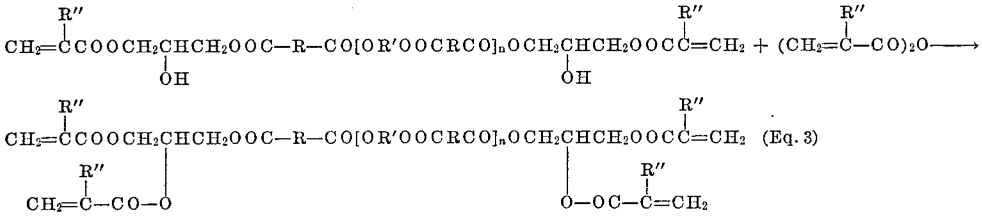

(Eq. 3)

Simple telomerized polyesters of this invention can be prepared from the reaction of two moles of a saturated aliphatic dicarboxylic acid, $R(COOH)_2$, one mole of a diol, $R'(OH)_2$, and two moles of a glycidyl acrylate,

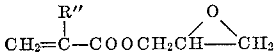

to give a product of the general formula

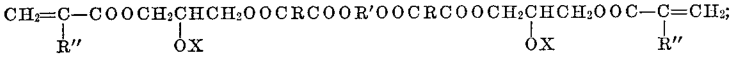

for example

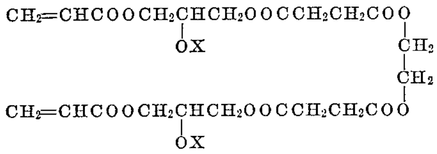

Instead of the free acids, $R(COOH)_2$ suitable derivatives such as their anhydrides, acid chlorides, or omega hydroxyalkyl esters may be used in the synthesis of these polyesters, and also instead of the diols, $R'(OH)_2$, the corresponding alkylene oxides,

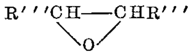

can, when available, also be used, wherein R''' is H or an alkyl group containing 1 to 10 carbon atoms.

Telomerized polyesters with a greater number of repeating segments, and therefore of higher molecular weight than the simplest polyesters, are prepared by increasing the ratio of the *n* moles of diol and the *n*+1 moles of dicarboxylic acid to the 2 moles of glycidyl acrylate to maintain the molar ratio of diol:diacid:glycidyl acrylate at *n*:(*n*+1):2. Thus it may be seen that a simple polyester is obtained with one mole of diol; two moles of diacid and two moles of glycidyl acrylate. When the value of *n* is increased for the diol to 2, the value for the diacid becomes 3 and that for the acrylic function remains constant at 2.

The linear polyesters can be prepared by various types of standard reactions used in preparing esters starting with acids or their anhydrides or acid halides and glycols or alkylene oxides. The conditions used are those appropriate for the normal reaction of alcohols with acids, anhydrides and acid halides to form esters, and also those normally used for the reaction of the glycidyl group with acids.

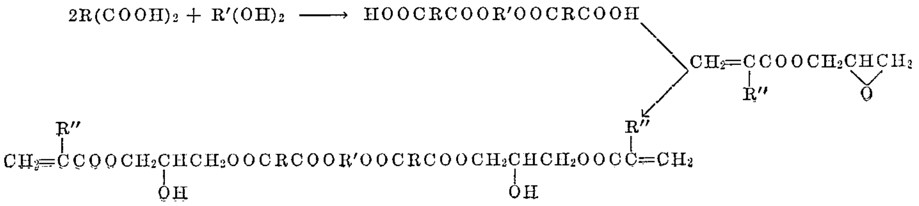

This product can be converted to compounds in which X represents an acyl radical by reaction with an appropriate acyl halide such as acrylyl chloride, or acyl anhydride such as acetic anhydride, to give the desired acyl derivative.

to about 8800 for *n* equal to 14 when the diacid is decenedicarboxylic acid and the diol is dodecanediol.

Some illustrative examples of the various HO—R′—OH alcohols which can be used in synthesizing the telomerized polyesters used in this invention are ethylene glycol, tri-

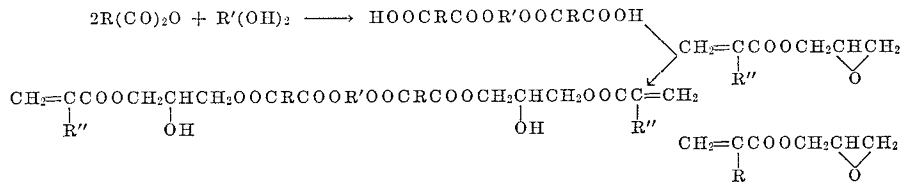

or:

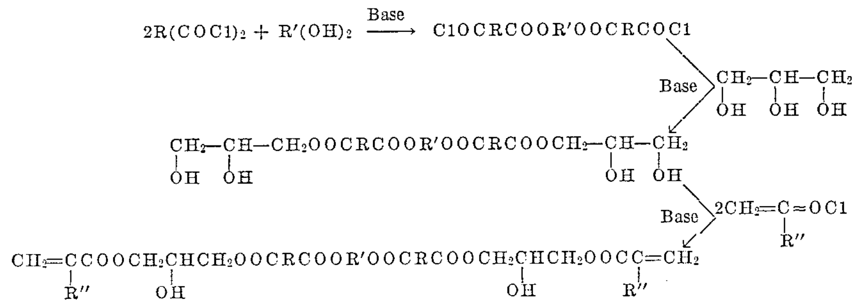

In the above formulas the derivative portion of the glycidyl acrylate component are represented by the structure

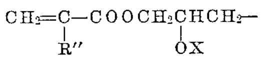

However, it is recognized that the oxirane ring of the glycidyl group may react so that the isomeric structure

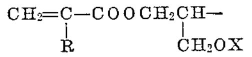

may be formed. It is intended that both of these isomeric structures are covered by the various formulas given hereinabove.

Oligomers in which the value of *n* is larger than 1 are readily prepared by the same reactions as given hereinabove by simply changing the ratio of the diol to the desired value of *n* and that of the diacid to *n*+1 while maintaining the molar quantity of the acrylic moiety at 2, thus methylene glycol, tetramethylene glycol, 2,3-dihydroxybutane, 1,4-dihydroxybutane, 1,4-dihydroxy-2-ethylbutane, 1,6-dihydroxyhexane, 1,8-dihydroxyoctane 2,10-dihydroxydecane, 1,4-dihydroxycyclohexane, 1,4-dimethylolcyclohexane, 2,2-diethyl-propanediol-1,3, 2,2-dimethylpropanediol-1,3, 3-methylpentanediol-1,4 2,2-diethylbutanediol-1,3,4,5-dihydroxynonane, pentamethylene glycol, heptamethylene glycol, nonamethylene glycol, decamethylene glycol, diethylene glycol, triethylene glycol, propylene glycol, dipropylene glycol, 2-ethylhexanediol-1,3, etc. Alkylene oxides can also be used to give corresponding glycol derivatives, such as propylene oxide, ethylene oxide, 2,3-butylene oxide, etc.

Some illustrative examples of the various

HOOC—R—COOH acids which can be used in preparing the telomerized polyesters used in the practice of this invention are oxalic, malonic, succinic, adipic, glutaric, sebacic, methyl succinic, pimelic, 2,3-dimethyl-succinic, suberic, hexyl-suc-

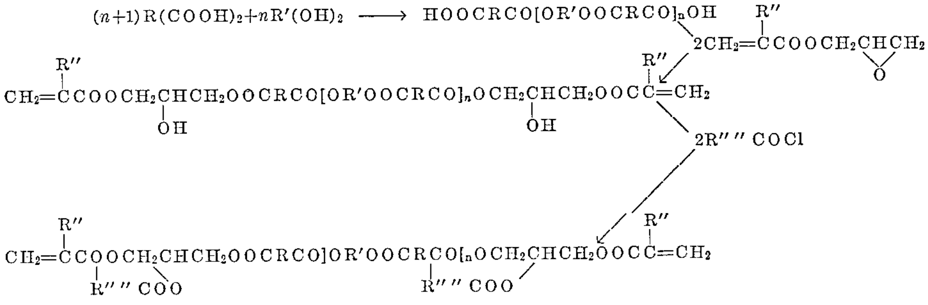

Depending on the nature of R, R′ and R″ the viscosity of these telomerized polyesters increases from about 100 to 9000 centistokes at 20° C. as the value of *n* increases from 1 to 14. Also depending on the values of *n*, R′ and R″, the molecular weight of these telomerized esters will vary from about 275 for the lowest one at a value of *n*=1 cinic, 1,3-hexahydrophthalic, 1,3-hexahydrophthalic, 1,4-hexahydrophthalic, 1,1-cyclobutanedicarboxylic acid, trans-1,4-cyclohanedicarboxylic, 3,3-diethyl-glutaric acid, 3,3-dimethyl-glutaric, 2,2-dimethyl-glutaric, 2,2-dimethylsuccinic, 2-keto-glutaric, diglycollic acids, etc.

It is most important to note that the various classes of telomerized polyesters used in the practice of this invention contain aliphaic hydrocarbon structures in their polycarboxylic acid and polyhydric alcohol segments. It is because of this aliphatic character that these telomerized polyesters are highly responsive to ionizing radiation, and in fact, substitution of any of the aliphatic polycarboxylic acids by aromatic carboxylic acids or substitution of the aliphatic polyhydric alcohol by aromatic alcohols, decreases the response to ionizing irradiation to such a point that they are not economically feasible.

As an example, the dimethacrylyl telomerized polyethylene succinate $$CH_2{=}\overset{\overset{\displaystyle CH_3}{|}}{C}{-}CO[OCH_2CHOOCCHCHCO]_nOCH_2CH_2OOC\overset{\overset{\displaystyle CH_3}{|}}{C}{=}CH_2$$

crosslinks at about 2 megarads, whereas the corresponding phthalyl derivative, $$CH_2{=}\overset{\overset{\displaystyle CH_3}{|}}{C}CO[OCH_2CH_2OOCC_6H_4CO]_nOCH_2CH_2OOC\overset{\overset{\displaystyle CH_3}{|}}{C}{=}CH_2$$

and the corresponding xylyl derivative $$CH_2{=}\overset{\overset{\displaystyle CH_3}{|}}{C}CO[OCH_2CH_2OOCH_2OC_6H_4CH_2CO]_nOCH_2CH_2OOC\overset{\overset{\displaystyle CH_3}{|}}{C}{=}CH_2$$

both require 12 and 14 megarads respectively, to become insoluble and infusible.

This difference is surprising particularly because these three telomerized esters all cure with radical initiators such as with 1% benzyl peroxide in about 90 to 95 seconds at 100° C., and with redox systems of cobalt and tertiary butyl hydroperoxide in three to three and one-half hours at room temperature. This difference is due, apparently, to the fact that aromatic ring compounds such as phenyl, naphthyl and the like are energy sinks for irradiation.

It will be noted too that the aliphatic hydrocarbon structures in the polycarboxylic and polyhydric alcohol segments are saturated. This is for the purpose of avoiding brittleness and reducing susceptibility to oxidation and discoloration in the irradiated products. By having unsaturation in the acrylyl groups at the ends of the telomerized diacryl polyester, the product is more ductile.

The term "irradiation," as used herein, means high energy radiation and/or the secondary energies resulting from conversion of this electron or other particle energy to neutron or gamma radiation, said energies being at least equivalent to about 100,000 electron volts. While various types of irradiation are suitable for this purpose, such as X-ray and gamma and beta rays, the radiation produced by accelerated high energy electrons has been found to be very conveniently and economically applicable and to give very satisfactory results. However, regardless of the type of irradiation and the type of equipment used for its generation or application, the use thereof in the practice of the invention as described herein is contemplated as falling within the scope of this invention so long as the ionization radiation is equivalent to about 100,000 electron volts.

While there is no upper limit to the electron energy that can be so applied advantageously, the effects desired in the practice of this invention can be accomplished without having to go above about 20,000,000 electron volts. Generally, the higher the electron energy used, the greater is the depth of penetration into the massive structure of the materials to be treated, and the shorter is the time of exposure required to accomplish the desired result. For other types of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev). In addition to radiations of this type, commonly called X-ray, an ionizing electromagnetic radiation suitable for the practice of this invention can be obtained by means of a nuclear reactor (pile) or by the use of natural or synthetic radioactive material, for example, Cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in United States Patent No. 2,763,609 and in British Patent No. 762,953 are satisfactory for the practice of this invention.

In the following examples, the radiation doses are reported in megarads, which represent 1,000,000 rads. A "rad" is defined as the unit of absorbed dose and is equal to 100 ergs per gram.

Many monomers as well as polymers have been subjected to ionizing radiation to convert them to improved or modified products. However, irradiation processes have been primarily of scientific interest, and very little use of such irradiation on polymer processes has been made industrially. This is primarily due to economic factors because of the cost of the ionizing radiation delivered to the system to be treated. For example, the well-known low-cost polyester systems which consist of a mixture of about equal parts by weight of styrene monomer and of unsaturated alkyd resin prepared from maleic or fumaric anhydride, phthalic anhydride and ethylene glycol or diethylene glycol can be more economically polymerized by free radical initiators than by ionizing radiation which requires about 25 to 40 megarads, depending on the formulation.

Such systems can be improved somewhat, however, by elimination of phthalic anhydride in the formulation of the polyester and substituting the higher cost monomeric acrylic esters for the styrene. Even in such systems, the economic factors are unfavorable not only because of the much higher cost of the mixture but because of the high volatility of the acrylic or methacrylic esters used. Even in such cases the irradiation dose required is of the order of 18 to 20 megarads and the systems are highly inhibited by oxygen. The addition of substances such as acetone or methyl ethyl ketone can reduce the required dose to 9 to 12 megarads. Even then the products possess the undesirable odor of unpolymerized acrylic monomer.

In contrast, by the use of the acrylyl telomerized polyesters used in the practice of this invention and described hereinabove, crosslinked, insoluble, infusible polymers can be prepared readily by subjecting the polyesters to ionizing radiation in doses of less than 8 megarads and in some cases to doses of 0.5 megarad or less, generally preferably at least about 1 megarad. Irradiation dosages in this range are economical.

Furthermore, the acrylyl components in these telomerized polyesters are located at the ends of the polyester chains where they can more effectively crosslink. More important, the acrylyl components comprise a minor portion of the composition, and are particularly economical when the value of $n$ in these telomerized polyesters is at least 2. In addition, because the molecular weight of the telomerized polyester is much higher than a corresponding simple monomer such as methyl methacrylate or ethyl acrylate, it can function in a single molecule both as monomer and as polymer.

This property of crosslinking at economical radiation doses is maintained when these telomerized polyesters are admixed with unsaturated alkyd resins alone or in the presence of other polymers provided the unsaturated alkyd resin and the other polymers are of the non-aromatic type, that is, they are free of aromatic rings which act as energy sinks and retard the crosslinking reaction. One of the advantages of these diacrylyl polyesters is their compatibility with various types of resins, particularly polyester or alkyd types.

A few illustrative examples of suitable polymers which may be dissolved in or mixed with the telomerized polyesters of this invention, along with the unsaturated alkyd resins, are the non-aromatic type polymers such as polyvinyl acetate, polyethyl acrylate, polymethyl methacrylate, cellulose acetate, cellulose butyrate, ethyl cellulose, polyethylene adipate, polyethylene azeleate, polydecamethylene succinate, polydecamethylene sebacate, etc. The telomerized polyester are also compatible with polyvinyl chloride, particularly upon the application of moderate heat.

The telomerized polyesters of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents of a non-aromatic nature best suited to the particular application. The products resulting from the irradiation of the telomerized polyesters of this invention can vary from soft flexible bodies to hard rigid masses.

The telomerized radiation sensitive polyesters of this invention are particularly useful in the preparation of the copolymers with unsaturated alkyd resins. In carrying this portion of the invention into effect, an esterification product of a polyhydric alcohol and an alpha, beta, unsaturated polycarboxylic acid is first prepared in accordance with techniques now well known to those skilled in the alkyd resin art.

Any aliphatic polyhydric alcohol containing at least two esterifiable aliphatic hydroxy groups, or mixtures of such alcohols, can be used in preparing the unsaturated alkyd resins. Examples of such polyhydric alcohols are ethylene glycol, di-, tri-, and tetra-ethylene glycols, thiodiglycol, glycerine, pentaerythritol, 1,4-dihydroxy-butene-2, dimethylol cyclohexane, dihydroxycyclohexane, etc. Any non-aromatic alpha-unsaturated, alpha beta-polycarboxylic acid, or mixtures of such acids, can be reacted with the polyhydric alcohol or alcohols to form the unsaturated alkyd resin. Examples of such polycarboxylic acids are maleic, fumaric, citraconic, mesaconic, acetylene dicarboxylic, aconitic cyclohexene dicarboxylic etc., itaconic and its homologues, as, for instance, alpha methyl itaconic acid, alpha, alpha-dimethyl itaconic acid, etc. Anhydrides of these polycarboxylic acids can also be employed.

In some cases, instead of using an unmodified, unsaturated alkyd resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc.

Anhydrides of these aids, if available, can also be used. The term "polycarboxylic acid" as used generally herein is intended to include the anhydrides of the acids.

The esterification products of polyhydric alcohols with ethylenic polycarboxylic acids, or with aliphatic polycarboxylic acids, can be further modified by introducing as a reactant in the preparation of the alkyd resin, a mono-esterifiable compound or compounds, more particularly a saturated or unsaturated normal or isomeric monohydric alcohol, or mixture thereof, a saturated or unsaturated monocarboxylic acid, or mixture thereof, or both such esterifiable monohydroxy organic compounds as well as by the use of hydroacids.

Examples of non-aromatic monohydric alcohols which can be used as modifiers of the alkyd resin are propyl, isopropyl, butyl, isobutyl, amyl, isoamyl, hexyl, octyl, decyl, dodecyl, tetradecyl, cetyl octadecyl cyclohexyl, cyclopentyl, etc. The use of methyl and ethyl alcohol is not precluded, but in general these alcohols are less satisfactory because of their lower boiling points. As monobasic acids there can be used, for example, the unsubstituted saturated and unsaturated normal or isomeric monocarboxylic acids containing only one esterifiable group, such as acetic, propionic, butyric to stearic, inclusive, hexahydrobenzoic, hexahydrotoluic, furoic acids, etc.

The monoesterifiable compounds can be introduced into the esterification before, during or after the esterification of the polyhydric alcohol with the polycarboxylic acid under conditions that promote interesterification of the monesterifiable compound with the incompletely esterified polyhydric alcohol-polycarboxylic acid product. That is, the monoesterifiable compound is introduced into the reaction mass before all of the acid groups of the polyhydric acid, or all of the alcohol groups of the polyhydric alcohol have been esterified.

The term "unsaturated non-aromatic alkyd resins," as used generally herein and in the appended claims, is intended to include within its meaning both unmodified esterification products of a non-aromatic polyhydric alcohol with a non-aromatic alpha-unsaturated, alpha, beta-polycarboxylic acid and esterification products of these components which have been modified, for example, as briefly described hereinabove. An alternate term is "unsaturated aliphatic alkyd resins" (including cycloaliphatic types).

To achieve copolymerization of the unsaturated alkyd resin with the telomerized polyesters of this invention, a solution or mixture of the unsaturated alkyd resin in the telomerized polyesters is first effected. Copolymerization of the components of the mixture is achieved rapidly and advantageously by ionizing radiation, such as by atomic radiation from a reactor, or from cobalt 60, or by means of high energy electrons generated by an electron linear accelerator.

Typical examples of unsaturated alkyd resins are:

Alkyd Resin A—ethylene glycol itaconate

| | Parts by weight |
|---|---|
| Ethylene glycol | 23 |
| Itaconic acid | 52 |

The components are mixed and slowly heated in the course of one hour from room temperature to 190° C., in an inert nitrogen atmosphere, and held at this temperature for three to five hours.

Alkyd Resin B—ethylene glycol maleate

| | Parts by weight |
|---|---|
| Ethylene glycol | 31 |
| Maleic anhydride | 32 |

The compounds are mixed and heated as in the preparation of alkyd resin A to 180° C., and held at that temperature for four to six hours.

Alkyd Resin C—acetic acid-modified diethylene glycol maleate

| | Parts by weight |
|---|---|
| Diethylene glycol | 106 |
| Maleic anhydride | 88 |
| Acetic anhydride | 10 |

The ingredients are mixed together and refluxed for one hour in an inert nitrogen atmosphere after which the reaction mixture is brought to 190° C., which temperature is maintained for four to six hours.

It will be understood, of course, that this invention is not limited to the use of the specific unsaturated alkyd resins mentioned above and that a broad modification of the nature of the copolymer is possible by using other unsaturated aliphatic alkyd resins or mixtures of such resins. As illustrative examples of other unsaturated alkyd resins, the following esterification products can be used, as illustrated in alkyd resins D to I. Aromatic alkyd resin J is included for comparison.

ALKYD RESIN

| Components: | Parts |
|---|---|
| D: | |
| Diethylene glycol | 160 |
| Maleic anhydride | 147 |
| E: | |
| Diethylene glycol | 106 |
| Itaconic acid | 130 |
| F: | |
| Glycerine | 18.4 |
| Itaconic acid | 39.0 |
| G: | |
| Ethylene glycol | 6.0 |
| Maleic anhydride | 19.6 |
| Hydroxypropyl acrylate | 26.0 |
| H: | |
| Ethylene glycol | 20 |
| Maleic anhydride | 29.4 |
| Succinic acid | 3.3 |
| I: | |
| Diethylene glycol | 30.6 |
| Maleic anhydride | 17.6 |
| Itaconic acid | 15.6 |
| J: | |
| Diethylene glycol | 30.3 |
| Maleic anhydride | 13.2 |
| Phthalic anhydride | 21.7 |

In many cases, instead of polymerizing a single telomerized polyester with a single unsaturated alkyd resin, mixtures can be used of two or more telomerized polyesters with a single unsaturated aliphatic alkyd resin, or a single telomerized polyester with two or more unsaturated aliphatic alkd resins, or a mixture of two or more telomerized polyesters with two or more unsaturated aliphatic alkyd resins. In conjunction with the alkyd resins, comonomers can be used which are copolymerizable with the telomerized polyester or with the unsaturated alkyd resins, or with both, for example, one or more telomerized polyesters can be used with one or more unsaturated aliphatic alkyd resins together with methyl methacrylate.

In addition to, or in lieu of the methyl methacrylate, other comonomers or mixture of comonomers can be used, for example, the vinyl esters, that is, vinylacetate, and the vinyl esters of saturated and unsaturated, and aliphatic, monobasic and polybasic acids, and more specifically the vinyl esters of the following acids: propionic, isobutyric, valeric, caprylic, capric, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimestic, etc., as well as the corresponding allyl, methallyl, etc. esters of the aforementioned acids.

Other suitable comonomers are the acrylic and alkacrylic acids and their derivatives, such as their esters, amides and corresponding nitriles, for example, acrylic acid, methyl acrylate, butyl acrylate, allyl acrylate, ethylene glycol diacrylate, acrylonitrile, methacrylonitrile, methacrylic acid, methyl methacrylate, etc.; the itaconic acid monoesters and diesters, such as the methyl ethyl, allyl, dimethallyl, the maleic and fumaric acid monoesters, diesters and their amide and nitrile compounds, such as, ethyl allyl maleate, fumaryl dinitrile, dimethallyl fumarate, etc.; the ethers, such as methallyl allyl ether, vinyl allyl ether, vinyl methallyl ether, allyl crotyl ether, vinyl crotyl ether; cyanuric acid derivatives such as diallyl cyanurate, triallyl cyanurate, trivinyl cyanurate, or in general, triazine compounds having at least one polymerizable or copolymerizable unsaturated group attached directly or indirectly to the triazine ring, as well as the partial, soluble or fusible polymers of the hereinabove listed monomers, etc.

The modified unsaturated aliphatic alkyd resins of this invention can be used alone or with fillers, dyes, pigments, opacifiers, lubricants, plasticizers, natural and synthetic resins or other modifying bodies in, for example, casting, molding, laminating, coating applications, and as adhesives, impregnants, and protective coatings.

In coating, impregnating and similar applications, the mixed monomeric or partially copolymerized materials, without added solvent can be applied to the object to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven fibrous cotton or glass materials, etc. They can also be used for the production of wire coatings and winding tapes, and for protectively coating impervious articles, such as metals, or for coating and impregnating articles such as paper, wood, cloth, glass fibers in felted woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one telomerized polyester of this invention and at least one unsaturated aliphatic alkyd resin, with or without modifying agents, can be cast under pressure while being irradiated.

In preparing the interpolymerization products of the unsaturated aliphatic alkyd resin and the telomerized polyester, the unsaturated alkyd resin can constitute as much as 98 or 99 percent by weight of the whole. In other cases the telomerized polyester alone, or admixed with aliphatic comonomers or modifiers, can constitute as much as 98 to 99 percent by weight of the whole.

In general, the proportions of the components used in a particular formulation will depend upon the particular properties desired in the interpolymer. For most applications, it is preferred to use 30 to 90 percent of the unsaturated aliphatic alkyd resin and from 10 to 70 percent of the telomerized polyester, since within these ranges interpolymers best adapted for most commercial applications can be produced.

Within these ranges the new interpolymers have a wide range of properties. For example, depending upon the particular telomerized polyester or mixture of telomerized polyesters used with the particular unsaturated aliphatic alkyd resin the particular proportions thereof, the conditions of polymerization, such as the temperature, pressure, presence or absence of additives, etc., the irradiation dose, and the extent of polymerization, they can vary from soft flexible bodies to hard rigid masses of varying resistance to solvents.

In the intermediate stages of copolymerization, some form fluid compositions of varying viscosities and may be so used. For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acids, bases, salts, solvents, swelling agents, and the like.

When it is desired to modify the properties of the polymers of the telomerized polyesters of this invention, this can be accomplished by copolymerizing a mixture comprising at least one telomerized polyester with at least one copolymerizable unsaturated ethylenic, or acetylenic hydrocarbon radical, more particularly, a $CH_2{=}C<$ radical, such as vinyl, allyl, methallyl, vinlidene, etc., or with a copolymerizable compound containing a $$-CH{=}CH<$$

or a $-CH{=}C<$, or a $>CH{=}CH<$ grouping, for example, as in vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc.; vinyl ketones, methvinyl ketones, olefinic nitriles, such as acrylonitrile, methacrylonitrile, fumaryl nitrile, beta-cyano-ethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc.; itaconic esters, for example, dimethyl itaconate, diethyl itaconate, diallyl itaconate; olefinic amides, for example, acrylamide, itaconamide, the maleic mono- and di-amides, and the corresponding imides, etc.; the vinyl ethers, for example, vinyl butyl ether, vinyl isobutyl ether, vinyl cyclohexyl ether, the dienes, etc., for example, butadiene, isoprene, dimethyl butadiene, etc.

In preparing copolymers of the telomerized polyesters with other polymerizable comonomers such as methyl methacrylate, acrylonitrile, and the like, the telomerized polyesters can constitute as little as 0.1 percent by weight of the whole, whereas in other cases, the telomerized polyesters alone can constitute as much as 98 to 99 percent of the whole. As in the case of the copolymers with unsaturated aliphatic alkyd resins, the proportion of the components in a particular formulation will depend upon the particular comonomers used and the particular properties desired in the copolymer. The polymers and copolymers can be prepared most readily by ionizing radiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

Example I

In a suitable reaction apparatus equipped with a stirrer, reflux condenser, inert gas inlet, heating mantle and thermostatic control for the reactor, are placed 284 parts of glycidyl methacrylate, 146 parts of adipic acid, 2 parts of hydroquinone. The mixture is heated, with stirring in a nitrogen atmosphere, at 130° C. for eighteen minutes, and there is obtained the product

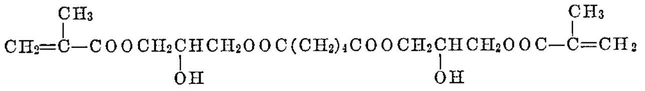

Example II

When 256 parts of glycidyl acrylate are used in the reaction of Example I with adipic acid instead of the 284 parts of glycidyl methacrylate, there is obtained the product

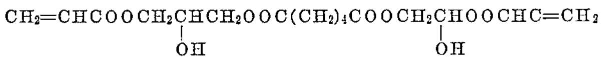

Example III

A mixture of 415 parts of the product of Example I, 204 parts of acetic anhydride and 1 part of tributyl amine are refluxed in a nitrogen atmosphere for one hour. Then the acetic acid by-product is removed by distillation under a reduced pressure of 5 mm. and there remains in the reaction flask 497 parts of the product

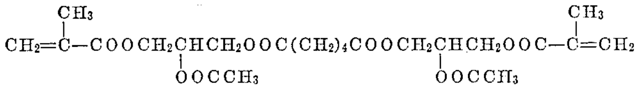

Example IV

The procedure of Example III is repeated except that instead of acetic anhydride there is used 252 parts of acrylic anhydride containing 1% of tertiary butyl alcohol, and there is obtained

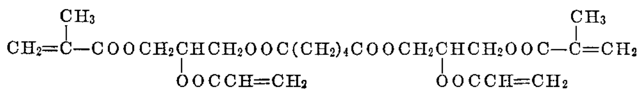

Example V

By repeating the procedure of Example III a number of times using molar equivalents respectively of the appropriate anhydrides, namely, methacrylic, stearic, methoxy acetic, acetic, acrylic and butyric anhydrides, the product of Example I is readily converted to the following derivatives:

(a') 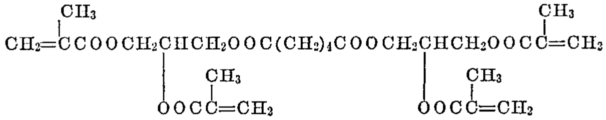

(b') 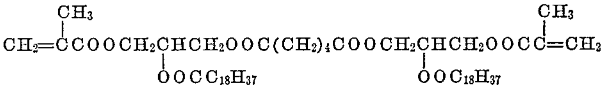

(c') 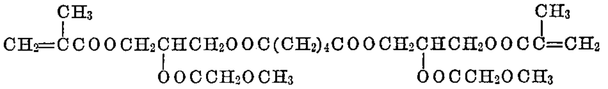

(d') 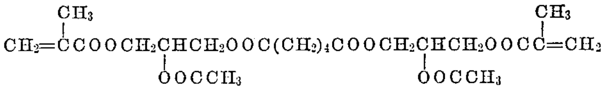

(e') 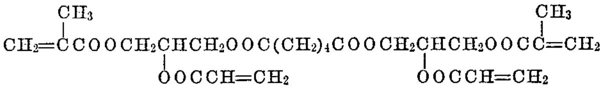

(f') 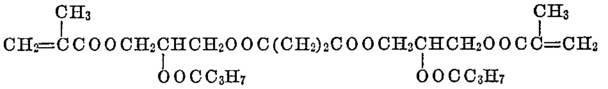

Example VI

To the reactor of Example I there is added, in a number of respective experiments, appropriate proportions of ethylene glycol and succinic anhydride and reacted at 180° C. for six hours to give a series of products having the general formula $$HOOC(CH_2)_2CO[OCH_2CH_2OOCCH_2CH_2CO]_nOH$$

wherein $n$ equals 1, 3, 5, 10, 12, 14 and 15. These are in turn each reacted with two molar proportions of glycidyl methacrylate to give seven products respectively of the general formula

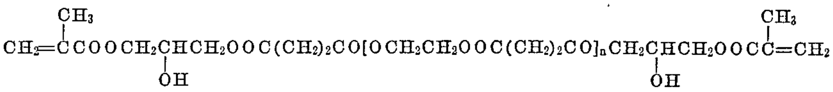

where $n=1$ for sample *a'*
$n=3$ for sample *b'*
$n=5$ for sample *c'*
$n=10$ for sample *d'*
$n=12$ for sample *e'*
$n=14$ for sample *f'*
$n=15$ for sample *g'*.

Example VII

The procedure of Example VI is repeated a number of times using molar equivalents of glycidyl acrylate instead of glycidyl methacrylate, and there are obtained seven products of the general formula

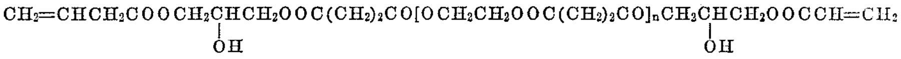

where $n=1$ for sample *a'*
$n=3$ for sample *b'*
$n=5$ for sample *c'*
$n=10$ for sample *d'*
$n=12$ for sample *e'*
$n=14$ for sample *f'*
$n=15$ for sample *g'*.

Example VIII

The seven products of Example VI, *a'* to *g'* inclusive, are treated with acetic anhydride by the procedure of Example III and there are obtained the acetyl derivatives of the general formula (a) 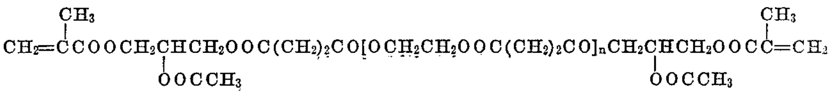

and when acrylic anhydride is used as the acylating agent according to Example IV, there are obtained the respective products (b) 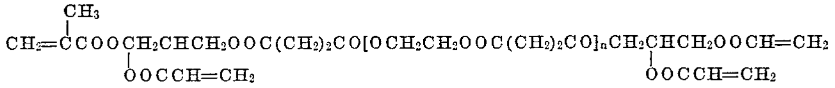

with the values of $n$ corresponding in each case to those of Example VI, where $n$ has the original numerical value of 1 to 15.

Example IX

When in Examples I, II and VI, other saturated aliphatic dicarboxylic acids, such as glutaric, dodecanedicarboxylic acid, hexahydrophthalic, etc., are used instead of adipic and succinic acid, the corresponding hydroxy substituted diacrylyl terminated polyesters are obtained. Similarly, when other aliphatic diols such as hexamethylene glycol, diethylene glycol, dihydroxycyclohexane, hexahydroxylylidene glycol etc., are used instead of ethylene glycol, the corresponding hydroxy substituted diacrylyl terminated polyesters are obtained. These hydroxy substituted polyesters are readily acylated by the procedures given in Examples III, IV, VII and VIII.

Example X

The procedure of Example VI is repeated a number of times using equivalent quantities of an aromatic dicarboxylic acid, phthalic anhydride, instead of the aliphatic dicarboxylic succinic anhydride, and there is obtained a series of products of the general formula

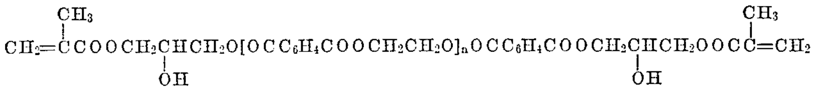

in which $n$=1 in sample *a'*
$n$=5 in sample *b'*
$n$=10 in sample *c'*
$n$=12 in sample *d'*.

Example XI

The procedure of Example VI is repeated using equivalent quantities of an aromatic dialcohol p-xylylidene glycol, $HOCH_2C_6H_4CH_2OH$ instead of ethylene glycol, and there is obtained a series of products of the general formula

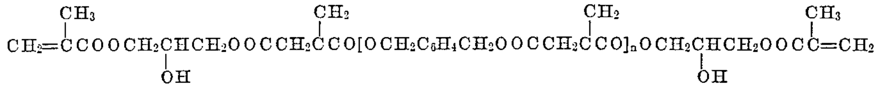

in which $n$=1 in sample *a'*
$n$=5 in sample *b'*
$n$=10 in sample *c'*
$n$=15 in sample *d'*.

Example XII

The telomerized hydroxy substituted polyesters of Examples I, II, and the acyl substituted polyester of Example III are irradiated in an aluminum dish while exposed to air and they crosslink at 2.0, 2.1, and 2.0 megarads respectively.

The telomerized polyesters of Example V*b'*, V*c'*, V*d'* and V*f'* are similarly irradiated; all become insoluble and infusible at dosages in the range of 2.2 to 3.1 megards.

Example XIII

The tetraacrylyl substituted polyesters of Examples IV, V*a'* and V*e'* are irradiated in an open container. These crosslink at irradiation dosages within the range of 0.90 to 1.4 megarads, indicating the extra sensitivity introduced into the diacrylyl telomerized polyester by the introduction of two additional acrylyl groups.

Example XIV

The seven telomerized polyesters of Example VI*a'* to VI*g'* inclusive are subjected to irradiation and those having values of $n$ from 1 to 14 crosslink under dosages increasing from 2 megarad for $n$=1 to 4.6 megarads for $n$=14. For $n$=15 crosslinking occurs at 6.7 megarads, indicating an economical upper limit for values of $n$ being less than 15. When, however, an average value of less than 15 can be obtained by mixtures of polyesters of $n$ being smaller than 15, for example $n$=1 to 12 admixed with a polyester of $n$=15, for example equal mixtures of ester of $n$=15 with esters of $n$=1 and 5 respectively, crosslinking occurs at 3.1 and 4.2 megarads respectively.

Irradiation of the seven telomerized samples VII*a'* to VII*g'* and VIII*a* inclusive shows similar results, indicating that $n$=14 is an economical upper limit.

Example XV

The seven tetraacrylyl polyesters of Example VIII*b* are submitted to irradiation of the linear accelerator and all of them crosslink in the range of 1 to 3.2 megarads indicating the marked effect of the additional acrylyl group which not only lowers the dosage requirements but also raises the upper limit of the value of $n$. The products vary from hard, tough, insoluble, infusible solids at $n$=1 to tough, infusible, insoluble, progressively more elastic polymers at $n$=15.

Example XVI

A cellulose sponge is impregnated with the telomerized polyester of Example VI*a'* dissolved in an equal weight of acetone so that after evaporation of the acetone at 25° C., the sponge contains 18% by weight of the polyester. On irradiation there is obtained a tough, rigid structural member of low density.

Example XVII

A printed face sheet whose design corresponds to that of a wood grain is impregnated with a mixture of the telomerized polyester, (1) VI*a'*, 50 parts; (2) VI*c'*, 20 parts; (3) VI*d'*, 10 parts; and (4) VIII*b* where $n$=2, 5 parts, and alkyd resin G, 15 parts; so that the sheet consists of 60 parts of polyester mixture and 40 parts of sheet by weight. This impregnated sheet is laid over a woodchip board and the whole irradiated to 4 megarads. There is obtained a finished board having the appearance of a fine grain, high gloss, varnished wood which is resistant to water, alcohol, acetone and most of the common organic solvents.

Example XVIII

| | Parts |
|---|---|
| Alkyd resin A | 80 |
| Telomerized polyester Example III | 20 |

The alkyd resin A and the telomerized polyester are thoroughly and uniformly mixed and subjected to ionizing radiation and converted to an insoluble, infusible hard product at a dose of 3.6 megarads.

Fillers such as wood flour, alpha cellulose, shredded cellulose derivatives, asbestos, paper, cloth, sand, silica, calcium sulfate, etc. can be coated or impregnated with the mixture and the mass hardened by irradiation to produce formed articles of good appearance and excellent physical properties and improved heat-resistance.

To improve the heat-resistance further the foregoing procedure is modified using a higher ratio of telomerized polyester to the unsaturated alkyd as follows:

| | Parts |
|---|---|
| Alkyd Resin A | 50 |
| Telomerized polyester III | 50 |

and

| | |
|---|---|
| Alkyd Resin A | 75 |
| Telomerized polyester III | 25 |

Compositions of the kind illustrated in this example have the advantage that they do not contain radical initiators and can be stored for long periods of time, and still are readily cured without the addition of catalyst by the simple expedient of subjecting them to irradiation.

Example XIX

The procedure of Example XVIII is repeated except that instead of Alkyd Resin A, there is used Alkyd Resin B and infusibility and insolubility is obtained at 3–4 megarads of irradiation.

The composition of Examples XVIII and XIX can be used as room temperature, low pressure laminating resins for the preparation of reinforced laminates from glass mats or fabrics.

It will be understood of course that this invention is not limited to the interpolymerization of Alkyd Resins A and B with the telomerized polyester of Example III, and that another acrylyl telomerized polyester alone or in combination can be used, for example, the telomerized polyesters of Examples I, II, and IV–IX inclusive, can also be used.

In contrast, when the aromatic containing telomerized polyesters of Examples X and XI are used, irradiation doses in excess of 18 megarads are required to produce hard, infusible polymers.

Similarly, high irradiation doses in excess of 16 megarads are required when the aromatic containing alkyd resin J is used with the acrylyl telomerized polyesters in contrast to the use of alkyd resins C, D, E, F, H and I which become infusible and insoluble in the range of 3.8 to 4.0 megarads.

The use of unsaturated alkyl resin G, which is an acrylyl terminated unsaturated alkyd in admixtures with the acrylyl telomerized aliphatic type polyesters, for example, the polyesters of Examples I, II and III is particularly beneficial since in all cases crosslinking occurs within the range of 1.8 to 2.1 megarads.

Example XX

A smoothly sanded pineboard 12 inches by 36 inches and ⅝-inch thick is coated on one surface with a mixture of equal parts of the polyesters of Example VIII to produce a layer of polyester 0.005-inch in thickness, and the board is progressed under the sweeping beam of the linear accelerator to be given a uniform dose of 3 megarads. The finished board has the appearance of a high gloss varnished lumber.

When the above polyester mixture is blended and milled with 60 parts of titanium dioxide pigment (paint grade) and the pigmented polyester applied to wood, fiber board or concrete block, a porcelainized finish is obtained when the coating is irradiated.

Example XXI

Fifty parts of the telomerized polyester of Example VIII*a* is diluted with 10 parts of glycol dimethacrylate and a concrete panel ⅛-inch thick is impregnated with this solution and the panel irradiated to a dosage of 3.5 megarads; a water-impervious panel is obtained.

Example XXII

A mixture of 80 parts of exploded wood fibers of the type used to prepare fiber board, 12 parts of the telomerized polyester of Example X*b'* 1 part of zinc stearate and seven parts of linseed oil are mulled to uniformity, pressed into a board and given 4.8 megarads of irradiation. There is obtained a well knit, hard board which is readily paintable with either solvent-type paints, or aqueous emulsion paints.

Example XXIII

Four parts of the polymer of Example VI*e'* are added to 10 parts of water containing 0.5% of sodium dioctyl sulfosuccinate as an emulsifying agent and the mixture emulsified in a colloidal mill. The emulsion of the telomerized polyester is added to 50 parts of prepuffed polystyrene beads mixed and the mixture tumbled until all the beads are uniformly coated. The water is then allowed to evaporate from the coated foamed beads which adhere slightly to each other. The coated foamed beads are then placed in a container such as a cardboard box and irradiated to a dose of about 4 megarads. By this process there is obtained a foamed structure in which the beads are all bonded with infusible bonds to each other, the shape of which conforms to the form of the container.

Example XXIV

A uniform mixture of 40 parts of the diacrylyl polyester of Example VI*a'* and 60 parts of a plastisol grade of polyvinylchloride having a molecular weight of about 25,000 is prepared. This is melt-extruded into pipe and given an irradiation dose of 3 megarads. The polyvinylchloride is not degraded by this small dosage and the treatment makes the pipe insoluble and infusible so that it withstands hot water 210° F. and hot saturated brine at 215° F. without softening. It also withstands hot solutions of acetic acid, toluene, carbon tetrachloride, etc.

While certain features of this invention have been described in detail with respect to various embodiments thereof, it will, of course, be apparent that other modifications can be made within the spirit and scope of this invention and it is not intended to limit the invention to the exact details shown above except as they are defined in the following claims.

The invention claimed is:

1. The highly radiation-sensitive telomerized diacrylyl polyester having the formula $$CH_2{=}\underset{\displaystyle R''}{\underset{|}{C}}COOCH_2\underset{\displaystyle OX}{\underset{|}{C}}HCH_2OOCRCO[OR'OOCRCO]_nOCH_2\underset{\displaystyle OX}{\underset{|}{C}}HCH_2OOC\underset{\displaystyle R''}{\underset{|}{C}}{=}CH_2$$

wherein *n* has a value of 0–14;

R represents a connecting linkage between two adjacent carboxylic radicals selected from the class consisting of a single valence bond and a divalent saturated aliphatic hydrocarbon radical having 1–10 carbon atoms;

R' is a divalent saturated aliphatic hydrocarbon radical having 2–10 carbon atoms;

R'' is a radical selected from the class consisting of hydrogen and methyl;

R'''' is a radical selected from the class consisting of hydrogen and an aliphatic hydrocarbon radical having 1–18 carbon atoms; and X is a radical selected from the class consisting of hydrogen and an acyl radical of the formula R''''CO.

2. The telomerized diacrylyl polyester of claim 1, which has the formula

```
CH2=CCOOCH2CHCH2OOCCH2CH2COOCH2CHCH2OOCC=CH2
    |        |                   |        |
    CH3      OH                  OH       CH3
```

3. The telomerized diacrylyl polyester of claim 1, which has the formula

```
    CH3                                   CH3
    |                                     |
CH2=CCOOCH2CHCH2OOCCH2CH2COOCH2CHCH2OOCC=CH2
             |                   |
             OOCCH=CH2           OOCCH=CH2
```

4. The telomerized diacrylyl polyester of claim 1, which has the formula

```
CH2=CCOOCH2CHCH2OOCCH2CH2CO[OCH2CH2OOCCH2CH2CO]nCH2CHCH2OOCC=CH2
    |        |                                     |        |
    CH3      OH                                    OH       CH3
```

5. The telomerized diacrylyl polyester of claim 1, which has the formula

```
CH2=CHCH2COOCH2CHCH2OOCCH2CH2CO[OCH2CH2OOCCH2CH2CO]nCH2CHCH2OOCH=CH2
               |                                        |
               OCH2CH=CH2                               OCH2CH=CH2
```

6. A process for producing an improved polyester resin composition comprising the treatment of a highly radiation-sensitive telomerized diacrylyl polyester having the formula

```
CH2=CCOOCH2CHCH2OOCRCO[OR'OOCRCO]nOCH2CHCH2OOCC=CH2
    |        |                           |        |
    R''      OX                          OX       R''
```

wherein *n* has a value of 0–14;

R represents a connecting linkage between two adjacent carboxylic radicals selected from the class consisting of a single valence bond and a divalent saturated aliphatic hydrocarbon radical having 1–10 carbon atoms;

R' is a divalent aliphatic hydrocarbon radical having 2–10 carbon atoms;

R'' is a radical selected from the class consisting of hydrogen and methyl;

R'''' is a radical selected from the class consisting of hydrogen and an aliphatic hydrocarbon radical having 1–18 carbon atoms; and X is a radical selected from the class consisting of hydrogen and an acyl radical of the formula R''''CO;

with at least about 0.5 megarad and no more than about 8 megarads of high energy, ionizing radiation equivalent to at least 100,000-electron volts.

7. The process of claim 6 in which said diacrylyl polyester is intimately admixed with a copolymerizable monomer, said diacrylyl polyester comprising 1–99 percent by weight of said copolymerizable mass and said copolymerizable monomer comprising 99–1 percent by weight of said copolymerizable mass.

8. The process of claim 6 in which said diacrylyl polyester is in intimate admixture with an unsaturated aliphatic alkyd resin, said diacrylyl polyester comprising 10–70 percent by weight of said copolymerizable mass and said unsaturated aliphatic alkyd resin comprising about 30–90 percent by weight of said copolymerizable mass.

9. The process of claim 6 in which said diacrylyl polyester has the formula

```
CH2=CCOOCH2CHCH2OOCCH2CH2COOCH2CHCH2OOCC=CH2
    |        |                   |        |
    CH3      OH                  OH       CH3
```

10. The process of claim 6 in which said diacrylyl polyester has the formula

```
    CH3                                   CH3
    |                                     |
CH2=CCOOCH2CHCH2OOCCH2CH2COOCH2CHCH2OOCC=CH2
             |                   |
             OOCCH=CH2           OOCCH=CH2
```

11. The process of claim 6 in which said diacrylyl polyester has the formula

```
CH2=CCOOCH2CHCH2OOCCH2CH2CO[OCH2CH2OOCCH2CH2CO]nOCH2CHCH2OOCC=CH2
    |        |                                      |        |
    CH3      OH                                     OH       CH3
```

12. The process of claim 6 in which said diacrylyl polyester has the formula

```
CH2=CHCH2COOCH2CHCH2OOCCH2CH2CO[OCH2CH2OOCCH2CH2CO]nCH2CHCH2OOCH=CH2
               |                                        |
               OCH2CH=CH2                               OCH2CH=CH2
```

13. A radiated polymeric product produced according to the process of claim 6.

14. A radiated polymeric product produced according to the process of claim 7.

15. A radiated polymeric product produced according to the process of claim 8.

16. A radiated polymeric product produced according to the process of claim 9.

17. A radiated polymeric product produced according to the process of claim 10.

18. A radiated polymeric product produced according to the process of claim 11.

19. A radiated polymeric product produced according to the process of claim 12.

20. A process for producing an improved polyester resin composition comprising the treatment of a highly radiation-sensitive telomerized diacrylyl polyester having the formula:

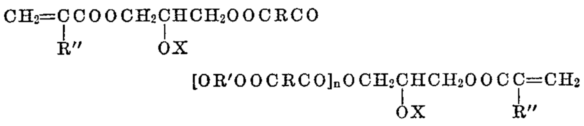

wherein *n* has a value of 0–14;

R represents a connecting linkage between two adjacent carboxylic radicals selected from the class consisting of a single valence bond and a divalent saturated aliphatic hydrocarbon radical having 1–10 carbon atoms;

R′ is a divalent aliphatic hydrocarbon radical having 2–10 carbon atoms;

R″ is a radical selected from the class consisting of hydrogen and methyl;

R″″ is a radical selected from the class consisting of hydrogen and an aliphatic hydrocarbon radical having 1–18 carbon atoms; and X is a radical selected from the class consisting of hydrogen and an acyl radical of the formula R″″CO;

with at least about 0.5 megarad of high energy, ionizing radiation equivalent to at least 100,000 electron volts.

References Cited

UNITED STATES PATENTS

| | | | |
|---|---|---|---|
| 2,379,251 | 6/1945 | Muskat et al. | 260—485 |
| 2,973,331 | 2/1961 | Kraft | 260—76 |
| 3,336,418 | 8/1967 | Dill | 260—884 |

OTHER REFERENCES

Burlant and Hinsch: α-Initiated Crosslinking of Unsaturated Polyesters, Journal of Polymer Science, vol. 61, pp. 303–309 (1962).

Chemical Abstracts, vol. 54, p. 624f.

MURRAY TILLMAN, Primary Examiner

RICHARD B. TURER, Assistant Examiner

U.S. Cl. X.R.

260—17.4, 40, 4, 28, 75, 485, 557, 56, 857

PO-1050
(5/69)

UNITED STATES PATENT OFFICE
CERTIFICATE OF CORRECTION

Patent No. 3,485,732 Dated December 23, 1969

Inventor(s) Gaetano F. D'Alelio

It is certified that error appears in the above-identified patent and that said Letters Patent are hereby corrected as shown below:

Column 2, line 29

(Eg.1a) should be --(Eq.1a)--;

Column 2, line 49

(Eg.1b) should be --(Eq.1b)--;

Column 5, line 69

_7OR'OOCRCO∠¯ should be -- ∠¯OR'OOCRCO7 --;

Column 9, line 32 polyester should be --polyesters--;

Column 11, line 67 alkd should be --alkyd--;

Column 13, line 35 vinlidene should be --vinylidene--

Column 17, line 73 te raacrylyl should be --tetraacrylyl--.

SIGNED AND
SEALED
SEP 29 1970

(SEAL)
Attest:

Edward M. Fletcher, Jr.
Attesting Officer

WILLIAM E. SCHUYLER, JR.
Commissioner of Patents